US006631166B1

(12) United States Patent
Carroll

(10) Patent No.: US 6,631,166 B1
(45) Date of Patent: Oct. 7, 2003

(54) METHOD AND APPARATUS FOR SIGNAL GENERATION AND DETECTION USING UNSTABLE PERIODIC CHAOTIC ORBITS

(75) Inventor: Thomas L. Carroll, Alexandria, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/455,167

(22) Filed: Dec. 6, 1999

(51) Int. Cl.[7] .............................................. H04L 27/00
(52) U.S. Cl. .............................. 375/259; 380/48; 380/9; 380/46; 380/263; 331/78; 364/717; 375/364; 375/367; 375/359; 375/316; 375/343; 375/377
(58) Field of Search ................................. 380/48, 9, 46, 380/263; 331/78; 364/717; 375/364, 367, 359, 316, 343, 377, 259

(56) References Cited

U.S. PATENT DOCUMENTS

| | | | |
|---|---|---|---|
| 4,688,212 A | 8/1987 | MacGinite et al. ........... 370/85 |
| 5,025,468 A | 6/1991 | Sikand et al. ................. 379/67 |
| 5,287,356 A | 2/1994 | Parkhideh ................ 370/85.12 |
| 5,400,348 A | 3/1995 | Yang ............................. 371/42 |
| 5,455,827 A | 10/1995 | Krause et al. ............. 370/68.1 |
| 5,515,421 A | 5/1996 | Sikand et al. ................. 319/67 |
| 5,583,442 A | 12/1996 | Isham et al. ................ 324/610 |
| 5,585,712 A | 12/1996 | Isham ........................ 323/315 |
| 5,610,792 A | 3/1997 | DeShazo .................... 361/103 |
| 6,363,153 B1 * | 3/2002 | Parker et al. ............... 380/263 |

OTHER PUBLICATIONS

Marino, Ines Perez ("Synchronization and Control of Chaotic Systems. Spatio–Temporal Structures and Applications to Communications", Jun. 1999, Universidad de Santiago de Compostela, Departamento de Compostela, Departamento de Fisca de la Materia Condensada).*
Carroll; IEEE Trans. on Circuits and Systems. Part I; Spread Spectrum Sequences from Unstable Periodic Orbits, in Publ.
Carroll; Physical Rev. E; vol. 59; No. 2; pp.1615–1621; Approximating Chaotic Time Series Through Unstable Periodic Orbits; Feb. 1999.
T. L. Carroll, *Approximating Chaotic Time Series Through Unstable Periodic Orbits*, 59 Physical Review E 1615 (No. 2, Feb., 1999).
Memo dated Dec. 2, 1999 from Thomas L. Carroll to Patent Counsel Code 1008.2, subject: Public disclosure of material in Navy Case 79321.

* cited by examiner

Primary Examiner—Stephen Chin
Assistant Examiner—Guillermo Munoz
(74) Attorney, Agent, or Firm—Chester L. Jordan; John J. Karasek

(57) ABSTRACT

A signal generator and signal receiver, as well as method of signal generation and transmission, in which selected unstable periodic orbits of a lossy chaotic system are identified and extracted, and portions of the orbits concatenated together to form a resultant signal. The selected orbits are known to the signal detector a priori. The signal detector detects the transmitted signal by correlation of the received signal with the known extracted orbits, also allowing the detector identify information which the generator imposed onto the signal.

7 Claims, 3 Drawing Sheets

Figure 1:
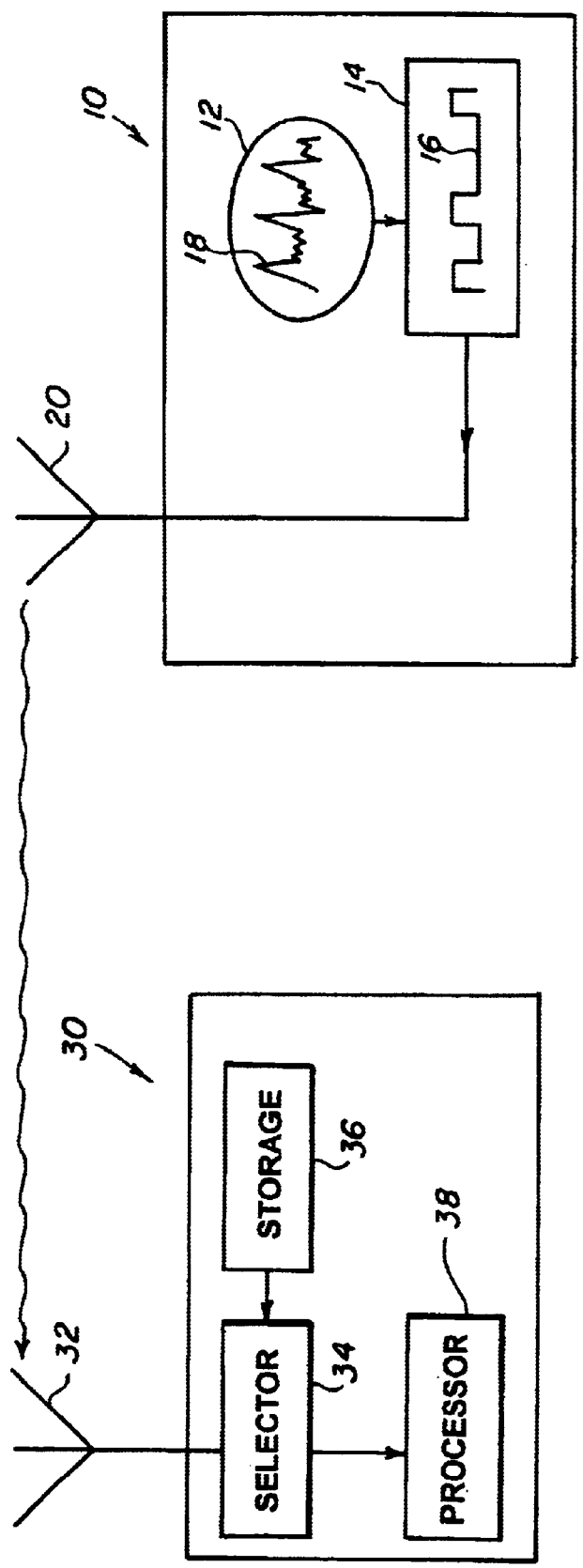

METHOD AND APPARATUS FOR SIGNAL GENERATION AND DETECTION USING UNSTABLE PERIODIC CHAOTIC ORBITS

BACKGROUND OF THE INVENTION

Communication signals are typically subject to large amounts of additive noise, and some current spread-spectrum communications systems can function when the noise is a thousand times as large as the informational signal. This-noise can include random noise, multipath interference, and noise from other carrier signals in the vicinity. Chaotic signals are being considered as the possible basis of communication systems, because of a number of inherent advantages. Because chaotic signals are not periodic, they are resistant to multipath interference. Chaotic signals do not correlate strongly with other signals, so they are easier to separate from noise. A chaotic signal is unique to each chaotic attractor, so one can build multiuser communications systems from different attractors, even if generated from the same chaotic system. Chaotic signals are broad band, so they are less likely to interfere with other signals, and are detectable even if hidden below background noise.

Towards this end, there has been considerable work done on removing noise from chaotic signals. Much of this work has been based on embedding a chaotic signal in a phase space in order to eliminate noise. In general, phase-space based noise reduction techniques are only good if one can successfully embed the chaotic signal in phase space, so that the noise-corrupted point in the phase space is not too far from its noise-free location. Such techniques have typically proved able to reduce noise on the order of ten percent of the amplitude of the chaotic signal, although some techniques could handle noise as large as the chaotic signal itself. All of these techniques attempt to recover an exact copy of the original chaotic signal. For some applications, it may be useful just to approximate the original chaotic signal, as long as the approximation maintains some useful and recoverable property of the chaotic signal.

SUMMARY OF THE INVENTION

Accordingly, an object of the invention is to provide a novel scheme for spread-spectrum communication.

Another object is to increase the signal to noise performance of communications based on chaotic carrier signals.

In accordance with these and other objects hereinafter, the invention concerns a apparatus and method for signal generation, and an apparatus and method for detection of signal detection. In particular, the signal transmitter has a signal generator, the output of which corresponds to the trajectory of a preselected lossy chaotic system, a modulator disposed to modulate information onto the output of the signal generator so as to produce a resultant modulated signal and a propagator disposed to transmit the modulated signal. The signal detector has a signal receiver and an information storage member, the storage member being disposed to record preselected unstable periodic orbits extracted from a preselected lossy chaotic system, a selector disposed to compare portions of a signal received from the receiver to the preselected orbits to determine, for each of the portions of the signal, which of said orbits best matches said portions of the signal, and a processor disposed to concatenate the best matches into a resultant detected signal.

The extracted orbits stored in the detector are preferably the preselected orbits of the signal generator. In this manner, the concatenated best matches will correspond to the to the signal sent from the signal generator. Because only certain selected orbits of the chaotic system are used, the detector does not have to recover an exact copy of the trajectory of the original chaotic system that generated the orbits, making extraction simpler and more reliable, and permitting use of more conventional detection techniques which are effective to reduce noise, such as cross-correlation.

These and other objects are further understood from the following detailed description of particular embodiments of the invention. It is understood, however, that the invention is capable of extended application beyond the precise details of these embodiments. Changes and modifications can be made to the embodiments that do not affect the spirit of the invention, nor exceed its scope, as expressed in the appended claims. The embodiments are described with particular reference to the accompanying drawings, wherein:

BRIEF DESCRIPTION OF THE DRAWING FIGURES

FIG. 1 is a plan diagram of a signal generator, and of a signal detector, according to the invention.

Figure 2A:
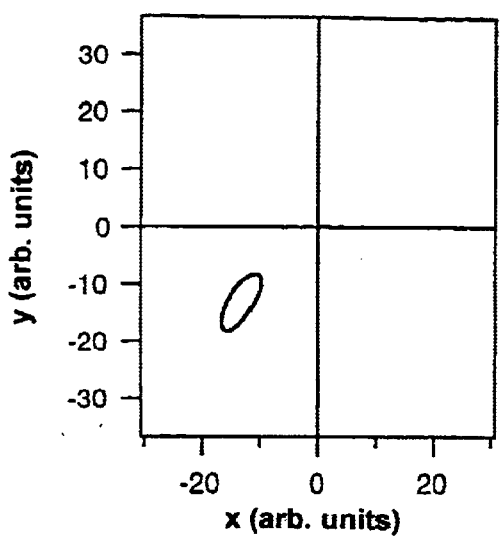
Figure 2B:
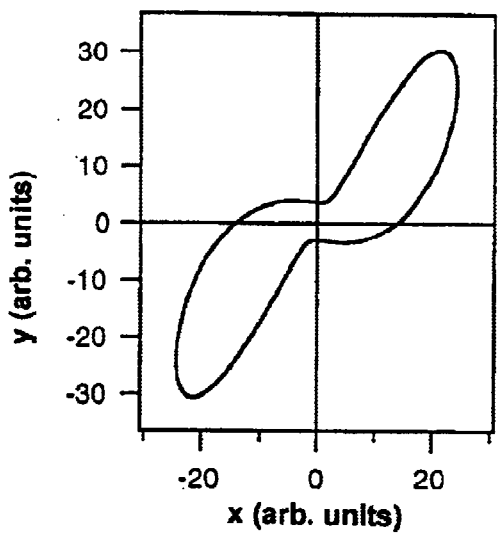
Figure 2C:
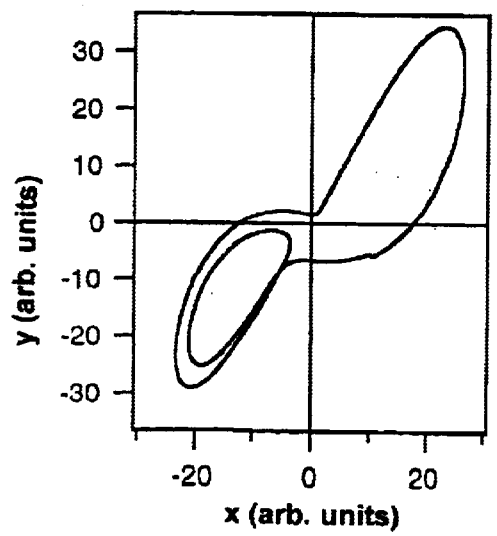
Figure 2:
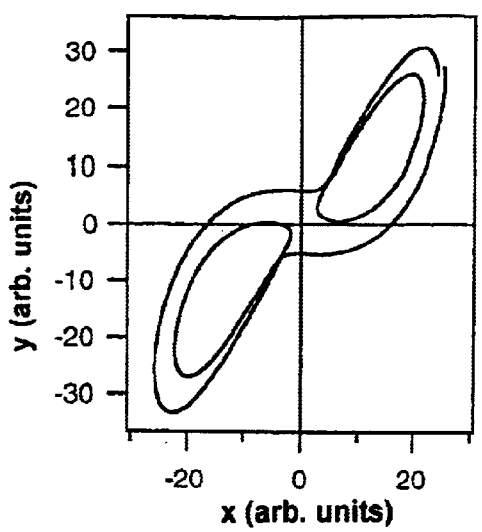
Figure 2E:
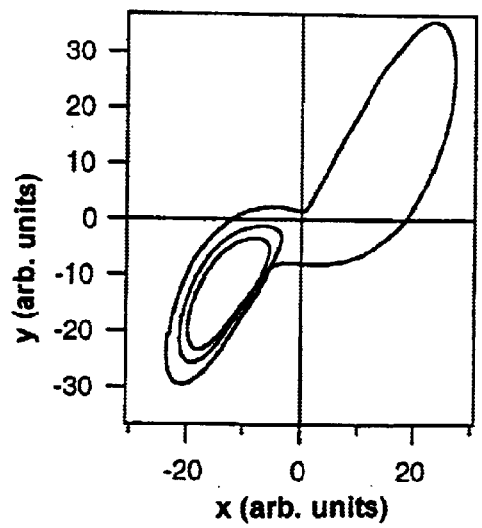

FIGS. 2($a$) through 2($e$) are maps of the first four unstable periodic orbits of a particular chaotic system.

Figure 3:
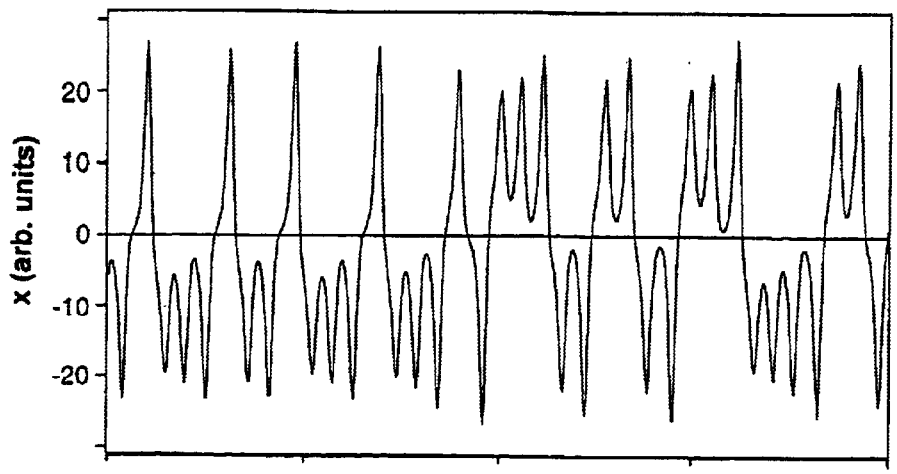

FIG. 3 is a graph as a function of time of one variable of the same chaotic system.

DETAILED DESCRIPTION

With reference to the drawing figures, wherein like references indicate like members throughout the several views, FIG. 1 illustrates a transmitter 10 and a receiver 30 in accordance with the invention. Transmitter 10 has a signal generator 12 which produces a signal 18 representative of the trajectory of a lossy chaotic system, attributes of which necessarily are the existence of at least one attractor, and a plurality of unstable periodic orbits, as is known to those skilled in this art. Modulator 14 modulates information onto signal 18, which member 20 propagates. Receiver 32 of signal detector 30 receives modulated signal 18, and inputs it into selector 34. Processor 34 preferably converts the signal into a time series to permit digital processing of the signal, although in principle one could practice the invention wholly in analog form, e.g. by use of analog computers. Storage area 36 contains a priori information about selected unstable periodic orbits of the chaotic system which produced signal 18, and provides this information to selector 34. Selector 34 partitions modulated signal 18 into temporal segments, and compares each segment with the orbits stored in member 36 in order to determine which orbit best matches each segment. Processor 38 uses this information and the knowledge of the selected unstable periodic orbits of the chaotic system which generates signal 18 to reconstruct signal 18 time segment by time segment. In so doing, processor 38 matches sequential segments in phase to maintain continuity from segment to segment, for example by use of the Fourier transform (preferably the Fast Fourier Transform) to identify the phase of each segment. To the extent that processor 38 correctly identifies the orbit corresponding to each time segment, the ultimate detected signal is noise free. This can be done quite effectively by any known scheme for detecting a signal in the presence of noise, and is preferably done by correlating each time segment with the unstable periodic orbits stored in member 36, and, for each segment, determining which of the orbits produces the largest cross-correlation.

To be rigorous, cross-correlation is done on sets of orthogonal time series, so that the cross-correlation between them is zero. In practice, the cross-correlation between the time segments and the orbit information in storage 36 will be non-orthogonal, and hence non-zero, because of the shortness of the time segments. Nevertheless, the cross-correlation between two identical periodic orbit sequences will be one. Because a chaotic system has one or more positive Lyapunov exponents, the cross-correlation between nonidentical sequences will be less than one, so it is possible to distinguish between periodic orbit sequences using cross-correlation. The accuracy of selecting the closest unstable periodic orbit based on the cross-correlation will increase as the length of the time series represent each time segment increases, and decrease as the noise level increases.

Chaotic signal 18 can be generated in any known manner, for example by adapting an electronic amplifier to have positive feedback, and then by using any known technique to extract its unstable periodic orbits, for example the method of close approaches. Preferably, however, signal 18 is generated by a computer programmed with equations that define a lossy chaotic system, by computation record as computer data the system's trajectory, and from these data extract system orbits in any conventional manner. By extracting orbits in the form of computer data, rather than by tracking a physical chaotic system, one avoids drift in system parameters, and thus increases the ability of receiver 30 to detect signals from transmitter 20 accurately.

The number of unstable periodic orbits of any chaotic system is, in principle, infinite. Selection of particular orbits for storage 36 is done so that those chosen will provide for a good system "skeleton," i.e. enough-orbits to permit reconstruction of signal 18 in processor 38 with reliability. In practice, one would extract all orbits having periods up to a preselected length. That length is determined by the nature of the detection scheme one uses, and the accuracy of detection one wishes, e.g. the more time series points one has the more accurate will be any correlation based on these points, etc. Thereafter one may compare, e.g. by correlation, these orbits with signal 18 to determine whether any of these orbits occurs so infrequently that it is unlikely to be useful or significant in approximating signal 18.

FIGS. 2–3 show an example of a signal such as could be used as signal 18, and are derived from a chaotic system defined by the equations of the Lorenz System, i.e.:

$$dx/dt=16(y-x)$$

$$dy/dt=-xz+45.92x-y$$

$$dz/dt=xy-4z$$

FIGS. 2(*a*) through 2(*e*) show five of the unstable periodic orbits of the Lorenz System, in the form of plots of the x and y system variables against each other. FIG. 3 shows the evolution over time of the x variable of the system. Typically, signal 18 will be constituted by one extracted system variable, such as x in FIG. 3, and storage 36 of detector 30 will have information of about the trajectory of this variable over time, for a preselected number of orbits, e.g. the five orbits illustrated in FIG. 2. Signal generator 12 could operate by employing any of a number of well-known chaotic systems to generate signal 18, such as an electronic amplifier with lossy positive feedback. Preferably, however, generator 12 employs a digital computer programmed with system equations, such as the equations of the Lorenz System, above, to generate signal 18. Use of a computer would prevent loss of fidelity due to parameter drift in electronic or other physical chaotic systems. Although the system of FIG. 2 is a three dimensional one, and the extracted chaotic signal of FIG. 2 is one dimensional, these are merely exemplary. In practice one could use a system of any order, and an extracted signal of any order.

Modulator 14 can modulate information onto signal 18 in any known manner, which, in principle, could include analog schemes such as amplitude, frequency, or phase modulation. Preferably, however, one would modulate digitally by either inverting or not inverting preselected sections of signal 18. For this to work, the attractor in signal generator 12 must not be identical under multiplication by −1. Detector 30, using a correlation scheme, would identify this by noting that the largest absolute value of cross-correlation between the relevant portion of signal 18, is a negative value. For a chaotic system which has plural attractors, digital states could be defined by which attractor the signal was produced by at a given time.

In practice, generator 12 extracts the unstable periodic orbits from a chaotic attractor and truncates them to a finite set of orbits. Thereafter one forms the signal data for storage in member 36. Forming these data may be done by either member 10 or 30, or done externally to members 10, 30 in any known manner, so long as one ultimately generates the orbit data for storage 36. This is done by initially generating all possible sequences of motion that may be represented by the lossy chaotic system which generates signal 18 in signal generator 10. These orbit sequences (called the UPO sequences) are each truncated to some fixed time duration, or length in time L, and stored in member 36. Selector 34 takes a segment of length L from the time series transmitted from transmitter 10 and selector 36 compares each orbit sequence in storage 36 to this fixed-length sequence. Processor 38 takes the UPO sequence of storage 34 that best fits the segment from the incoming signal as the best approximation to that piece of the incoming signal. Detector 30 repeats this for the remaining segments of the incoming time series.

Preferably, one would further truncate the set of UPO sequences as follows: After fitting a large number of segments from the incoming time series, one may make a histogram of how many times each UPO sequence provided the best fit. Some UPO sequences will be used many times and some will be used rarely. One may discard all UPO sequences that provide the best fit fewer than some set number of times.

If the incoming signal 18 has been contaminated by noise, it may be difficult to determine which UPO sequence provides the best fit to each time series segment. One may improve the approximation of noisy signals by creating longer UPO sequences. While it is possible to set the length L to a higher number in step 3, one can also create UPO sequences of length 2L by combining sequences of length L. One may continue this process to create sequences of length 3L, 4L, etc.

In general, one can extract the UPO sequences from the equations for the dynamical system producing signal 18, or from one or more signals from the dynamical system. If the equations for the chaotic system are known, one may use Newton's method. If the equations are not known, one must reconstruct the chaotic attractor based on a signal from the attractor using the well-known method of delays. If one has signals corresponding to all the variables in the attractor, one may construct the attractor directly by plotting all the variables in a phase space. Once the attractor has been reconstructed, it is possible to extract the UPO's using any one of a number of known methods, such as the method of close returns.

Once a set of low period UPO's has been obtained, it is necessary to construct UPO sequences of a fixed length L.

The value of L will depend on the rate at which the signals from the chaotic attractor were digitized (or the integration time step used if the attractor is simulated numerically), the largest Lyapunov exponent for the chaotic attractor generating the UPO's, and the quality of fit desired. If one desires to use Fourier transform methods to compare the UPO sequences to the incoming time series, it is useful to choose L as a power of 2. If one desires a better approximation, or if the largest Lyapunov exponent for the chaotic attractor is large, L should be made smaller.

It may occur that some of the UPO's are shorter than L and some are longer. In this case, the longer UPO's may be truncated, but it is necessary to build UPO sequences of length L by combining the shorter UPO's. In order to get UPO sequences that approximate possible motion on the attractor, one must decide which UPO's can follow in sequence. Some sort of rule is required to determine which UPO can follow which preceding UPO. It is also necessary to consider all possible phases for each UPO when forming UPO sequences in order that the sequences correspond to likely trajectories of the chaotic system. One skilled in the art will recognize many such rules, once informed of the reason for so doing by this specification. One example of such a rule is the condition that the UPO sequences must be continuous, so the rule used is that the starting point of one UPO must come within some tolerance of the end point of the previous UPO. The exact value used for the tolerance is an approximation, but the size of the tolerance will depend on how quickly the chaotic attractor can evolve, which will depend on the largest Lyapunov exponent and the digitization (or integration) time step. Another rule for matching UPO's to form UPO sequences if to require that all signals and their derivatives be continuous. If the UPO comes from a three dimensional attractor, for example (meaning that three variables can describe the motion), then three derivatives must be used. Yet another rule could be to match phases of UPO sequences by combining two orbits where the orbits cross zero, or where they most closely approach zero. Another rule could be that of prediction based on an a priori knowledge of system equations. To match two orbits, one uses the equations to predict the next point of one orbit, and then uses the equations to set that point as the initial condition (state) to the other orbit within an acceptable tolerance. This is particularly useful if one uses a chaotic map to define the system recursively. There may be other approximation techniques for matching UPO's to form UPO sequences. The approximation technique used may depend on the degree of approximation required.

There are many possible ways to compare the individual sequences from the set of UPO sequences to the incoming signal. The incoming signal may consist of one variable or several variables. The corresponding variables from each UPO sequence are used for comparison. If the UPO sequences have length L, then a segment of length L from the incoming time series is chosen. Some of the possible comparison techniques could include finding the Euclidean distance between each UPO and the segment from the time series, finding the ratio of each UPO sequence to the time series segment, or finding the cross-correlation between each UPO sequence and the time series segment. Cross-correlation is particularly useful because different chaotic signals are not correlated with each other. Although it would be necessary to perform an infinite cross-correlation to get the cross-correlation between two chaotic signals to be exactly zero, finite length chaotic signals that are similar to each other will have a larger cross-correlation than finite length chaotic signals that are less similar to each other.

Noise and other interference signals will not be correlated with the chaotic incoming signal, so performing a cross-correlation will lessen the effects of interfering signals. It is efficient to perform the cross-correlation calculation using Fourier transform techniques, which is why it is useful to set the UPO sequence length L to some power of 2. The Fourier transform technique is also useful because it takes into account all possible phase shifts between the individual UPO sequences and the incoming time series segment.

At this stage, processor 38 has chosen some UPO as the best approximation to the incoming chaotic signal segment. The next segment of length L from the incoming time series is then compared to each of the UPO sequences in the same way, and the best approximation is again chosen. This process is repeated until the end of the incoming signal has been reached.

If detector 10 keeps track of which UPO sequence was the best approximation to each segment from the incoming time series signal, then it is possible to make a histogram based on the number of times each UPO sequences appears as the best approximation. One may then set some threshold so that UPO sequences that are the best approximation less than some set number of times are removed from the set of UPO'sequences. The lower the threshold, the better the approximation, but only up to a certain point. Some UPO sequences might never occur in the actual chaotic attractor. It has been noted in the literature that certain types of motion do not occur in all chaotic attractors.

Noise corruption in signal 18 will decrease the magnitude of the cross-correlation between each UPO sequence and the segments of signal 18 of length L, and make it more difficult to determine which UPO sequence is the best approximation to the incoming chaotic signal. To improve the approximation in the presence of noise, longer UPO sequences can be used. Longer UPO sequences may be constructed by combining sequences of length L to form sequences of length 2L, 3L, etc. The sequences may be combined by considering which UPO sequence may follow which other UPO sequence as described above. Choosing the best approximation to the incoming time series segment (of length 2L, 3L, etc) and truncating the set of UPO sequences may also proceed as described above.

Aspects of the invention are also described in the paper by the inventor entitled *Approximating Chaotic Time Series Through Unstable Periodic Obits, Physical Review E*, volume 59, at p. 1615 ff. (no. 2, February, 1999), which is incorporated by reference herein in its entirety for all purposes.

The invention has been described in what is considered to be the most practical and preferred embodiments. It is recognized, however, that obvious modifications to these embodiments may occur to those with skill in this art. Accordingly, the scope of the invention is to be discerned from reference to the appended claims, wherein.

I claim:

1. A signal detector comprising:
   a signal receiver;
   an information storage member, said storage member disposed to record preselected unstable periodic orbits extracted from a preselected lossy chaotic system;
   a selector, said selector disposed to compare portions of a signal received from said receiver to said preselected orbits to determine, for each of said portions of said signal, which of said orbits best matches said portions of said signal; and
   a processor disposed to concatenate said best matches into a resultant detected signal.

2. A communications system comprising:

a signal generator, the output of said signal generator corresponding to the trajectory of a preselected lossy chaotic system;

a modulator disposed to modulate information onto said output of said signal generator to produce a modulated signal;

a propagator disposed to transmit said modulated signal from said transmitter;

a signal receiver disposed to receive said modulated signal;

an information storage member, said storage member disposed to record preselected unstable periodic orbits extracted from said preselected lossy chaotic system;

a selector, said selector disposed to compare portions of said modulated signal received from said receiver to said preselected orbits to determine, for each of said portions of said modulated signal, which of said orbits best matches said portions of said signal; and a processor disposed to concatenate said best matches into a resultant detected signal.

3. A method of signal detection comprising:

disposing an information storage member to record preselected unstable periodic orbits extracted from a preselected lossy chaotic system;

disposing a selector to compare portions of a signal received from a receiver to said preselected orbits to determine, for each of said portions of said signal, which of said orbits best matches said portions of said signal; and disposing a processor to concatenate said best matches into a resultant detected signal.

4. A method of communication comprising:

generating a signal corresponding to the trajectory of a preselected lossy chaotic system;

modulating information onto said signal to produce a modulated signal;

transmitting said modulated signal;

disposing an information storage member to record preselected unstable periodic orbits extracted from said preselected lossy chaotic system;

disposing a selector to compare portions of a signal received from a receiver to said preselected orbits to determine, for each of said portions of said signal, which of said orbits best matches said portions of said signal; and disposing a processor to concatenate said best matches into a resultant detected signal.

5. The device disclosed in claim 1 wherein said signal receiver does not employ a preamble or a synchronizing signal to synchronize the signal detector to a received chaotic signal.

6. The system disclosed in claim 2 wherein said system functions without employing a preamble or a synchronizing signal to synchronize the signal receiver to the transmitter.

7. The system disclosed in claim 4 wherein said system functions without employing a preamble or a synchronizing signal to synchronize the signal receiver to the transmitter.

* * * * *